United States Patent [19]
Ostrobrod

[11] Patent Number: 5,975,499
[45] Date of Patent: Nov. 2, 1999

[54] QUADRAPOD SAFETY SUPPORT FOR FALL PROTECTION SYSTEMS

[76] Inventor: Meyer Ostrobrod, 2070 Bennett Rd., Philadelphia, Pa. 19116

[21] Appl. No.: 08/956,877

[22] Filed: Oct. 23, 1997

Related U.S. Application Data

[60] Provisional application No. 60/029,648, Oct. 28, 1996.

[51] Int. Cl.⁶ .................................................. B66D 1/00
[52] U.S. Cl. ..................... 254/332; 254/329; 211/196; 248/171
[58] Field of Search .................................. 254/323, 329, 254/332, 334, 264, 266, 380; 211/196, 197; 248/171, 188.7

[56] References Cited

U.S. PATENT DOCUMENTS

| | | | |
|---|---|---|---|
| 1,344,660 | 6/1920 | Stevenson | 211/196 X |
| 1,456,356 | 5/1923 | Bentley | 211/196 |
| 1,701,153 | 2/1929 | Green | 248/171 X |
| 1,837,637 | 12/1931 | Walberg | 248/171 |
| 1,863,442 | 6/1932 | Goodman | 248/171 |
| 1,894,695 | 1/1933 | Ley | 248/171 |
| 2,374,021 | 4/1945 | Korling | 248/171 |
| 4,324,477 | 4/1982 | Miyazaki | 248/171 X |
| 5,267,712 | 12/1993 | Shen | 248/188.7 X |
| 5,280,841 | 1/1994 | Van Deursen | 211/197 |
| 5,794,899 | 8/1998 | Tamllos | 248/171 X |

*Primary Examiner*—Donald P. Walsh
*Assistant Examiner*—Emmanuel M. Marcelo
*Attorney, Agent, or Firm*—Norman E. Lehrer

[57] ABSTRACT

Quadrapod (12) having a central vertical support column (20) and a horizontal plate (22) fixed to the upper portion is disclosed. A slide ring (30) surrounds the column (20) and is movable substantially throughout the length thereof from the bottom of the column to the undersurface of the plate (22). Four pairs of legs (52, 54) extend outwardly from the ring (30) and the plate (22) and terminate in four different feet (56). Each pair of legs includes an upper leg (52) pivotally connected between the plate (22) and the foot (56) and a lower leg (54) pivotally connected between the movable ring (30) and the foot (56). In its operative position, the ring (30) is moved downwardly so that the legs extend outwardly and the quadrapod rests on the four feet. In its collapsed position, the ring (30) is moved upwardly so that the legs and feet are moved inwardly so as to be substantially parallel to the center column. Each of the feet includes a vertical adjusting means (58). The top (24) of the column provides a support for a lever or support arm (14) that extends outwardly from the device. Fall protection devices (16) and/or a winch (18) or the like are also supported on the support arm (14).

3 Claims, 4 Drawing Sheets

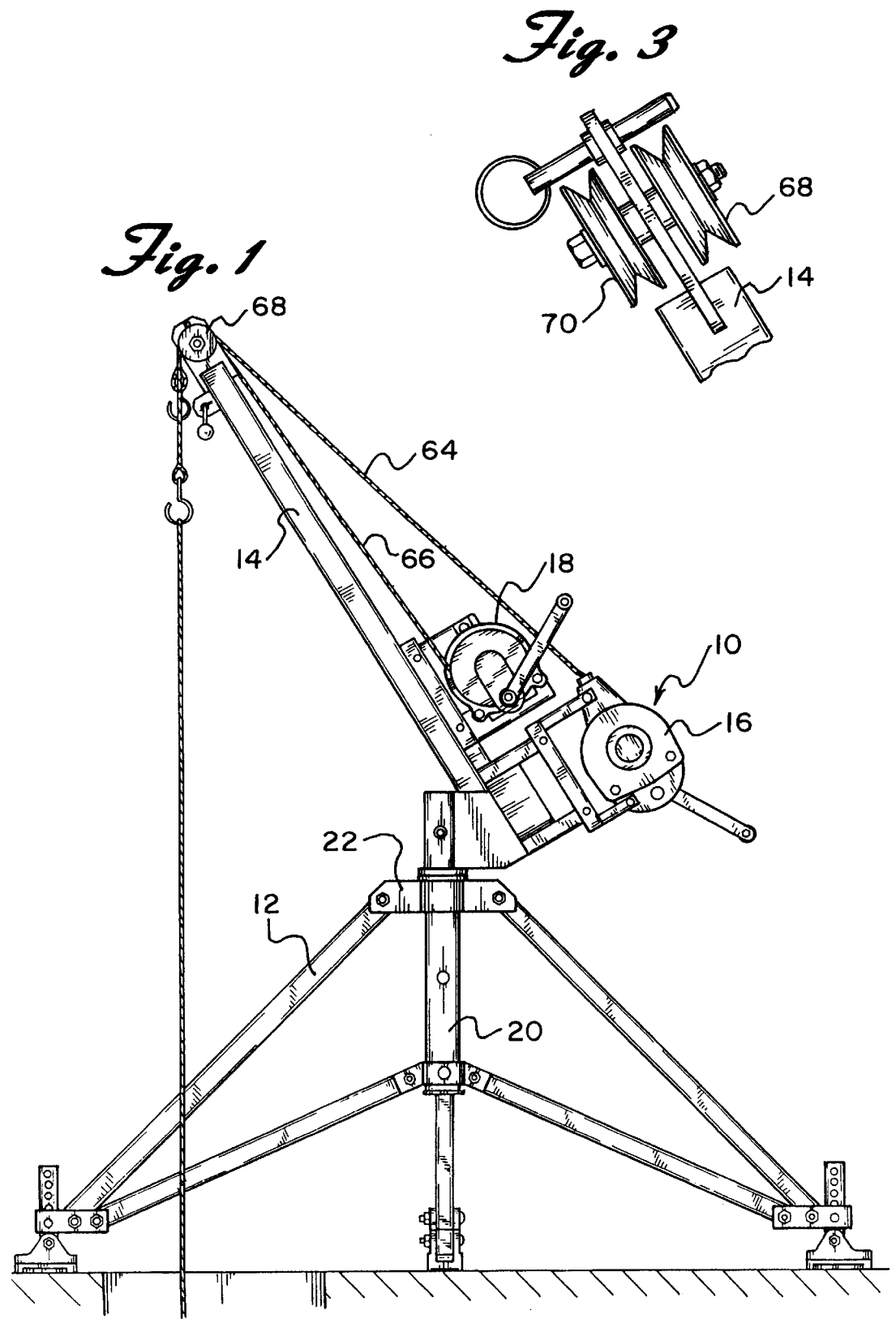

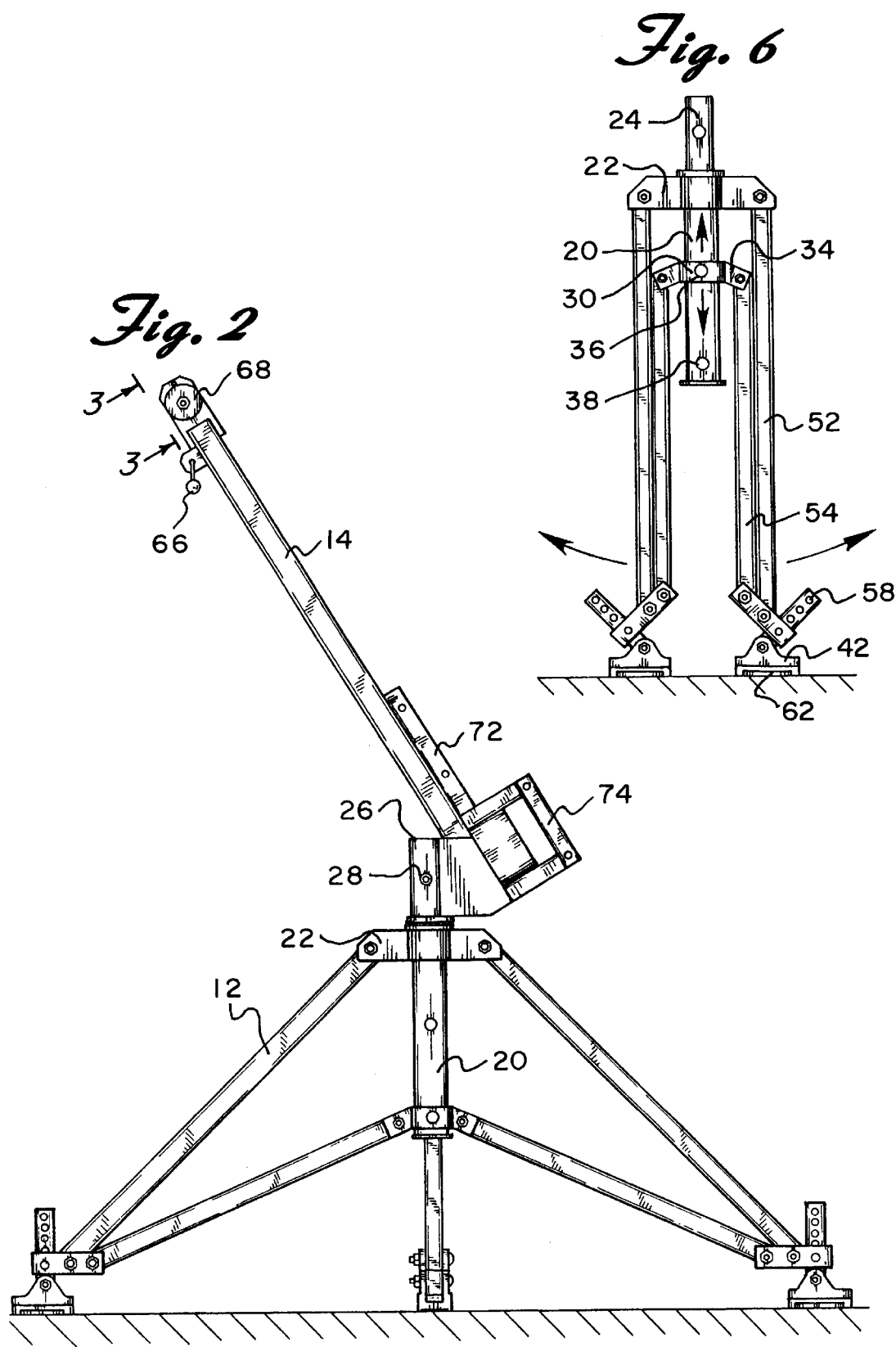

QUADRAPOD SAFETY SUPPORT FOR FALL PROTECTION SYSTEMS

CROSS-REFERENCE TO RELATED APPLICATION

This application claims the benefit of U.S. Provisional patent application Ser. No. 60/029,648, filed Oct. 28, 1996.

DESCRIPTION

1. Technical Field

The present invention is directed toward a quadrapod and, more particularly, toward a quadrapod of the type utilized in the vicinity of a manhole or the like to aid in the introduction or removal of a workman or equipment into or out of the hole.

2. Background Art

The invention has particular use with fall protection devices such as shown in Applicant's U.S. Pat. No. 4,511,123. Such devices are personal fall arrest systems which are used in conjunction with other components such as a tripod or the like for anchoring the device and a body harness which is worn by a workman. The present invention may also be utilized with known winches or similar devices for manually raising or lowering the workman or construction equipment or the like.

Frequently, tripods are used as a support means for supporting the fall protection devices and/or winches. Because of the nature of a tripod, the same is place directly over the manhole with the cables or ropes suspending the workman or equipment extending downwardly from the centerpoint of the tripod. When utilizing a tripod, this type of arrangement provides for the greatest support.

There are instances, however, when it is not possible to place the tripod directly over the manhole or other opening. This may be due to the terrain around the hole or it may be the result of the fact that the equipment being lowered may be too large to fit within the center of the tripod. When this occurs, it is desirable to include a support having an arm or the like that extends outwardly from the tripod. Unfortunately, when a tripod is being utilized, it provides very little support at a location outwardly therefrom and a weight suspended from the arm could easily cause the tripod to tilt.

It has been found, therefore, that a quadrapod or four-legged support must be utilized. Quadrapods provide substantially more support without the tendency to tip over. Known quadrapod supports, however, have been cumbersome to assemble and disassemble and have not always provided sturdy support.

DISCLOSURE OF THE INVENTION

The present invention is designed to overcome the deficiencies of the prior art described above. The invention provides a quadrapod having a central vertical support column and a horizontal plate fixed to the upper portion thereof. A slide ring surrounds the column and is movable substantially throughout the length thereof from the bottom of the column to the undersurface of the plate. Four pairs of legs extend outwardly from the ring and the plate and terminate in four different feet. Each pair of legs includes an upper leg pivotally connected between the plate and the foot and a lower leg pivotally connected between the movable ring and the foot. In its operative position, the ring is moved downwardly so that the legs extend outwardly and the quadrapod rests on the four feet. In its collapsed position, the ring is moved upwardly so that the legs and feet are moved inwardly so as to be substantially parallel to the center column. Each of the feet includes a vertical adjusting means. The top of the column provides a support for a lever or support arm that extends outwardly from the device. Fall protection devices and/or a winch or the like are also supported on the support arm.

BRIEF DESCRIPTION OF THE DRAWINGS

For the purposes of illustrating the invention, there are shown in the accompanying drawings forms which are presently preferred; it being understood that the invention is not intended to be limited to the precise arrangements and instrumentalities shown.

FIG. 1 is a front elevational view of the quadrapod with associated fall protection safety and winch devices mounted thereon and constructed in accordance with the principles of the present invention;

FIG. 2 is a view similar to FIG. 1 with the safety device and winch removed therefrom for clarity;

FIG. 3 is a view taken through the line A—A of FIG. 2;

FIG. 6 is a front elevational view showing the quadrapod in its collapsed position.

BEST MODE FOR CARRYING OUT THE INVENTION

Figure 4:
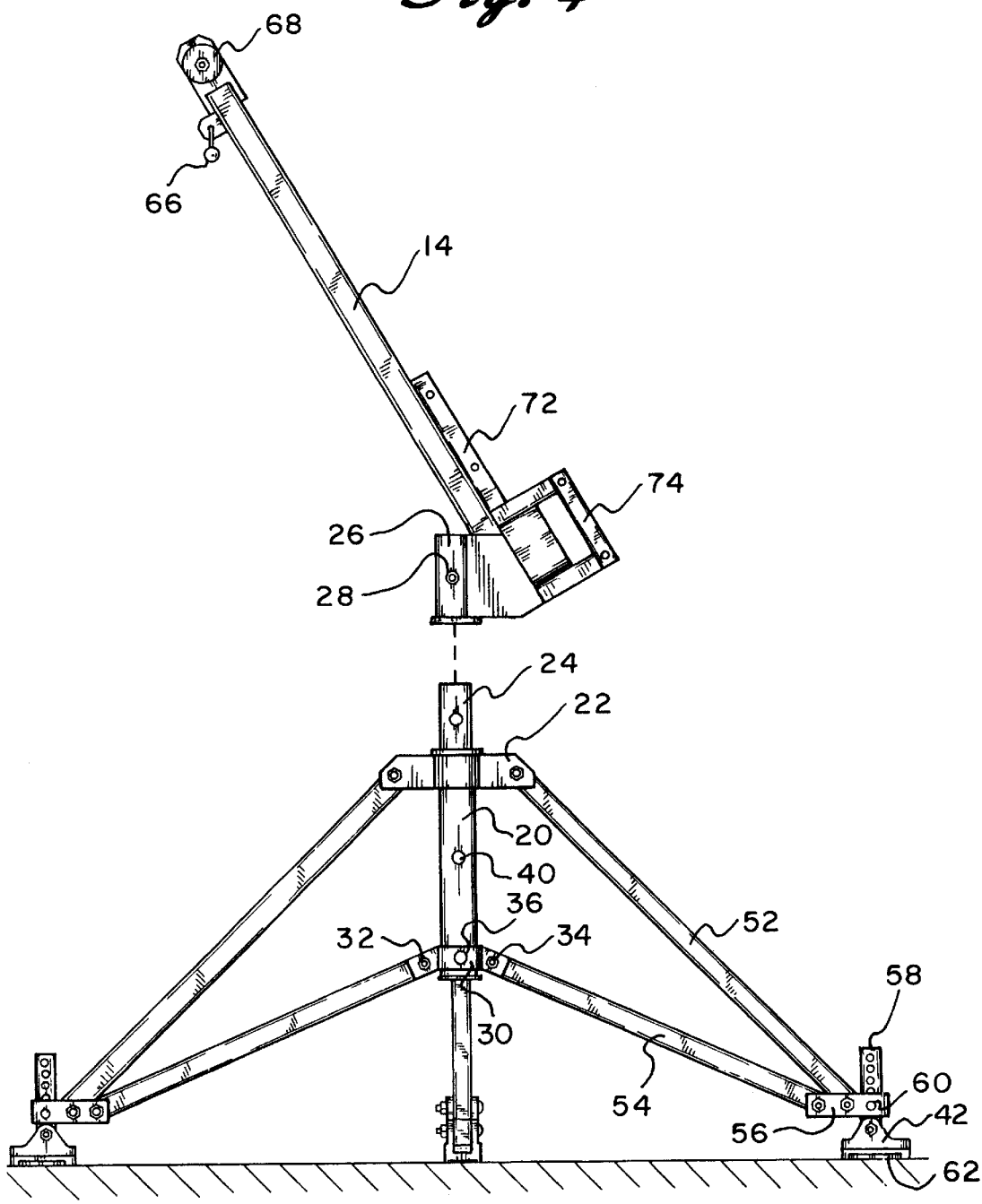
FIG. 4 is a view similar to FIG. 2 showing the upper support arm removed from the support base.
Figure 5:
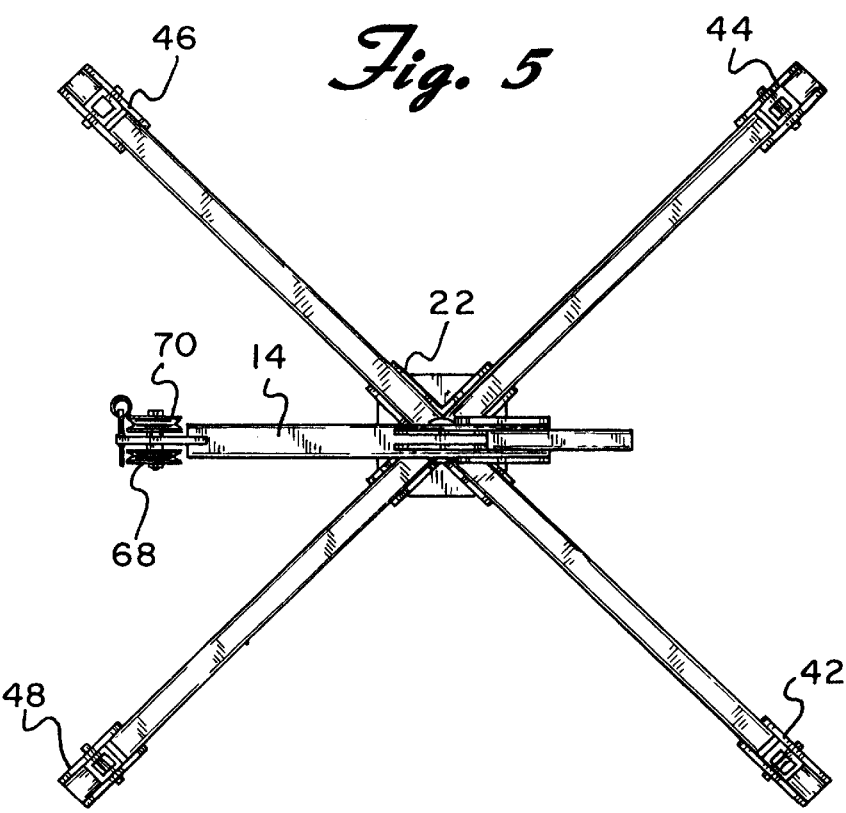
FIG. 5 is a top plan view of the invention.

Referring now to the drawings in detail wherein like reference numerals have been used throughout the various figures to designate like elements, there is shown in FIG. 1 a quadrapod safety system constructed in accordance with the principles of the present invention and designated generally as 10. The system 10 is comprised essentially of a quadrapod support 12 having support or lifting arm 14 secured to the top thereof. The lifting arm 14 preferably carries a fall protection device 16 of known construction and a winch 18 or the like which may be used to lift or lower a workman or equipment or the like into or out of an opening.

The quadrapod is comprised essentially of a central support column 20 having a plate 22 rigidly secured to the upper portion thereof but below the top of the column 20. This leaves an upper portion 24 of the column 20 exposed so that the proximate end 26 of the lever arm assembly 14 can be placed thereon. This arrangement allows the lever arm assembly 14 to swivel around the column 20 while still being secured to the quadrapod 12. Rotation, however, can be prevented by inserting a pin or the like through the opening 28 in the housing 26 which would cooperate with a similar opening or the like in the upper portion 24 of the column 20.

In addition to the plate 22, the quadrapod 12 also includes a ring 30 which is slidable up and down the column 20. The ring 30 includes four equally spaced tabs therearound such as shown at 32 and 34. The ring 30 is movable essentially between a first opened position shown in FIGS. 1, 2 and 4 wherein it is located substantially at the bottom of the column 20 to an upper closed position shown in FIG. 6 wherein the ring is located toward the upper portion of the column 20. In either position, the ring can be locked in place utilizing a pin or the like which can be inserted through cooperating openings 36 formed in the ring and 38 or 40 formed in the column 20.

The quadrapod 12 also includes four feet 42, 44, 46 and 48 that are spaced substantially equally around the same. Each foot has a pair of legs associated therewith such as shown at 52 and 54 in FIG. 4. Since all of the pairs of legs and all of the feet are substantially identical, the following will describe only foot 42 and legs 52 and 54. It will be understood, however, that this description applies equally to the remaining feet and legs.

As is best seen in FIGS. 4 and 6, on end of upper leg 52 is pivoted to the plate 22 and extends from the same to a bracket 56 attached to the foot 42. Similarly, lower leg 54 is pivotally attached to the tab 34 on ring 30 at one end and to the bracket 56 at the other end. As a result of these pivotal connections, the ring 30 is capable of moving upwardly and downwardly so as to place the quadrapod in the open, operative position as shown in FIG. 4 or the closed position as shown in FIG. 6.

Extending upwardly from the foot 42 is a rod 58 that passes through the bracket 56. The height of the foot can be adjusted utilizing a pin that passes through an opening 60 in the bracket 56 and one of the plurality of vertically spaced apart holes in the rod 58. The bottom of the foot 42 includes a nonfriction surface 62.

In use, the legs and feet of the quadrapod are extended and the arm assembly 14 is mounted on the top of the column 20. The cables or other lifting lines 64 and 66 from the safety device 16 and winch 18 pass over the pulleys 68 and 70 which are mounted at the free upper end of the arm 14. As shown in FIGS. 2 and 4, the lower end of the arm 14 includes separate mounting brackets 72 and 74 to which the safety device 16 and winch 18 can be secured.

In normal use, the quadrapod is opened and placed at the vicinity of a manhole or other opening. The lifting arm assembly 14 is then secured to the top of the same along with the safety device 16 and winch 18. The assembly is then arranged so that the lines 64 and 66 extend straight downwardly into the desired opening. If necessary, because of an uneven surface, the height of one or more of the feet can be adjusted in the manner described above.

When it is desired to disassemble the quadrapod device, the lifting arm assembly is removed and the pin holding the ring 30 in the lowermost position is also removed. The ring 30 is then allowed to move upwardly into the collapsed position shown in FIG. 6 wherein the legs also move inwardly.

Figure 7:
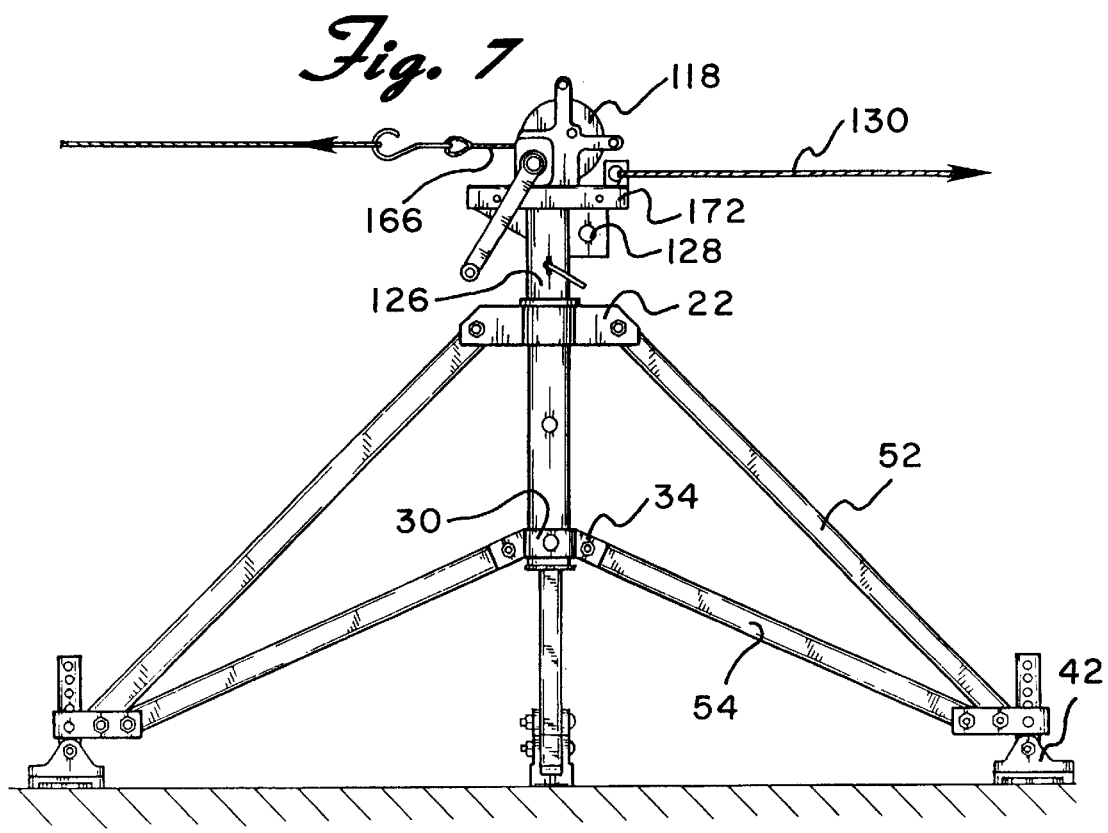
FIG. 7 shows the use of the quadrapod in a slightly modified form.

There may, on occasion, be times when it is desired to utilize the quadrapod to exert forces in a horizontal position. This can be accomplished utilizing the slight modification shown in FIG. 7. In this embodiment, a second support bracket 126 is secured over the top 24 of the column 20. The bracket 126 also includes support means similar to the supports 72 and 74 so that a winch 118 can be mounted thereon. The support 126 includes one or more eyelets 128 which can be used to secure the same to a fixed support such as a parked vehicle or a building or the like through the use of a cable 130. The cable 166 from the winch 118 can, therefore, be utilized to pull a load horizontally when the handle 168 is turned.

The present invention may be embodied in other specific forms without departing from the spirit or essential attributes thereof and accordingly reference should be made to the appended claims rather than to the foregoing specification as indicating the scope of the invention.

I claim:

1. A quadrapod safety system including:

a central support column including an upper portion and a lower portion;

a plate member rigidly secured to said upper portion of said central support column but below the top thereof so that the upper part of said column extends above said plate member;

a ring member surrounding said column and slidably movable up and down said column between the lower portion thereof and said plate member and including means for fixedly securing said ring member to said column in a plurality of different positions so as to prevent movement thereof, four feet members and four leg pairs substantially equiangularly spaced around said column; each of said leg pairs having an upper leg member and a lower leg member with each having a first end and a second end, said first ends of said upper and lower leg members being pivotally secured to a respective foot member, said second ends of said upper leg members being pivotally secured to said plate member and said second ends of said lower leg members being pivotally secured to said ring member, and means for adjusting the height of each of said feet with respect to its respective leg pairs.

2. The quadrapod as claimed in claim 1 further including a lever arm assembly mounted at the top of said column and extending outwardly therefrom.

3. The quadrapod as claimed in claim 1 further including a winch mounted on the top of said column.

* * * * *